(12) United States Patent
Chittaro et al.

(10) Patent No.: US 7,988,946 B2
(45) Date of Patent: Aug. 2, 2011

(54) METHOD FOR RECYCLING ZIRCONIUM TETRAFLUORIDE INTO ZIRCONIA

(75) Inventors: Léonard Chittaro, Ugine (FR); David Lasalmonie, Le Versond (FR)

(73) Assignee: Compagnie Europeenne du Zirconium-Cezus, Courbevoie (FR)

( * ) Notice: Subject to any disclaimer, the term of this patent is extended or adjusted under 35 U.S.C. 154(b) by 0 days.

(21) Appl. No.: 11/477,319

(22) Filed: Jun. 28, 2006

(65) Prior Publication Data

US 2007/0003474 A1 Jan. 4, 2007

Related U.S. Application Data

(60) Provisional application No. 60/697,225, filed on Jul. 6, 2005.

(30) Foreign Application Priority Data

Jun. 30, 2005 (FR) ...................................... 05 06697

(51) Int. Cl.
 *C01G 25/02* (2006.01)
(52) U.S. Cl. ........................... 423/608; 423/69; 423/492
(58) Field of Classification Search .................. 423/608, 423/69, 492
See application file for complete search history.

(56) References Cited

U.S. PATENT DOCUMENTS

| 5,145,720 A * | 9/1992 | Hirai et al. ............... 427/255.36 |
| 5,688,477 A * | 11/1997 | Nel ................................. 423/82 |
| 5,788,935 A * | 8/1998 | Furic .............................. 423/69 |
| 2005/0161121 A1 * | 7/2005 | Qian et al. ..................... 148/247 |

FOREIGN PATENT DOCUMENTS

| EP | 0 723 038 | 7/1996 |
| GB | 815 425 | 6/1959 |

OTHER PUBLICATIONS

C. B. Finch et al., Growth of Monoclinic Macrocrystalline $ZrO_2$ by Hydrolysis of $ZrF_4$-LiF-NaF Melts at 650-800° C., J. Crys. Growth, 60 (1982), 321-324, Mar. 25, 2009.

Yokoyama et al.., Vapor Phase Growth of Stabilized Zirconia Crystals by Hydrolysis of Zirconium Fluoride, J. Of Crystal Growth, 78(2) : 418-20, 1986.

Search Report from French Patent Application No. : FR 0506697 mailed Apr. 5, 2006.

* cited by examiner

*Primary Examiner* — Ngoc-Yen M Nguyen
(74) *Attorney, Agent, or Firm* — Davidson, Davidson & Kappel, LLC

(57) ABSTRACT

The method allows $ZrF_4$ to be converted into $ZrO_2$, by carrying out a thermal conversion operation based on solid $ZrF_4$ and water which are heated in a reactor until converted into $ZrO_2$. The initial ratio by weight of $ZrF_4$ to water is in particular between 1/5 and 1/500, and this ratio is maintained substantially for the entire duration of the conversion. The thermal conversion is carried out at a temperature greater than or equal to 300° C. The invention is used in particular for recycling pickling baths for zirconium alloys.

26 Claims, 1 Drawing Sheet

METHOD FOR RECYCLING ZIRCONIUM TETRAFLUORIDE INTO ZIRCONIA

CROSS REFERENCE TO OTHER APPLICATIONS

This application claims the benefit of U.S. Provisional Application No. 60/697,225 filed on Jul. 6, 2005 and French application 05/06697 filed Jun. 30, 2005.

FIELD OF THE INVENTION

The present invention relates to a method for recycling zirconium from zirconium tetrafluoride, in particular solutions of this tetrafluoride from operations for pickling zirconium alloys.

BACKGROUND INFORMATION

Fuel assemblies for a nuclear reactor and in particular fuel assemblies for a light water nuclear reactor are generally constituted by a bundle of mutually parallel fuel rods that are retained by a framework which comprises in particular longitudinal guide tubes and transverse spacer grids.

The fuel rods may be constituted by a cladding of zirconium alloy into which pellets of fuel material are introduced. The guide tubes of the framework may also be constituted by zirconium tubes.

The production of zirconium tubes from blanks requires a plurality of successive cold-rolling operations that are each followed by a thermal annealing operation. Between each of the cold-rolling operations and the consecutive heat treatment, a degreasing and chemical pickling operation is carried out on the rolled tube.

Planar products, such as sheets and strips, are also produced from zirconium alloy and are also subject to a chemical pickling operation, as may also be the case for the semi-finished products which are used for their production.

The chemical pickling of components of zirconium alloy is carried out using a solution of hydrofluoric acid HF which contains a given proportion of nitric acid $HNO_3$ that is used as a catalyst for the corrosion of zirconium using hydrofluoric acid, in accordance with the chemical reaction $Zr+4HF \rightarrow ZrF_4+2H_2$.

The used pickling solution which is recovered in a storage container after the pickling operation principally comprises hydrofluoric acid, water and nitric acid and zirconium fluoride $ZrF_4$, which is formed during the pickling operation.

Baths for pickling zirconium alloy can be processed to separate the water from the solution of residual products, such as $ZrF_4$, which are generally then discharged.

EP-A-0 723 038 from the company Zircotube describes a method for recycling used pickling solutions, wherein:
- part of the water contained in the used solution is evaporated under vacuum then condensed in order to obtain water which is slightly acidic and a concentrated acidic solution containing $ZrF_4$ which represents almost 30% by volume of the used solution,
- the concentrated acidic solution containing $ZrF_4$ is processed by vacuum evaporation in a crystalliser in order to obtain crystals of $ZrF_4$ and a purified concentrated acid solution, and
- the slightly acidic water and the purified concentrated acidic solution are mixed in the desired proportions in order to obtain a reprocessed pickling solution.

Following the evaporation applied to the concentrated acid solution which contains $ZrF_4$, there remains, in the bottom of the crystallizer, a suspension or brine of $ZrF_4$ crystals. These crystals can be separated from the aqueous solution through a filter, such as a filter press, before being discharged to a storage center.

Production units for components of zirconium alloy must therefore involve significant costs with regard to the separation and discharge in approved centers. A significant proportion of zirconium is lost and not reused.

Having an efficient and economical method for recycling zirconium from this $ZrF_4$ would be doubly advantageous by limiting the losses of zirconium metal in the overall production process for components of zirconium alloy and reducing the costs connected with the discharge operation.

Various methods have been examined, without any being able to be used in an industrial application.

The reduction of tetrafluoride by calciothermy. This is a highly exothermic reduction which must be carried out explosively in an inert atmosphere in order to prevent the metal from becoming contaminated by oxygen and nitrogen. It is therefore dangerous in industrial quantities. The reaction is as follows:

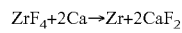

$ZrF_4+2Ca \rightarrow Zr+2CaF_2$

Direct electrolysis of the tetrafluoride has been examined but it is necessary to provide an installation which is too complex.

Van Arkel reduction is a technique which is not suitable since the molecule of $ZrF_4$ is too stable. The decomposition heat thereof would require a filament temperature which is greater than the melting point of zirconium.

Another method is calcination. It involves bringing the zirconium tetrafluoride to a high temperature. It then decomposes into zirconium releasing molecules of hydrofluoric acid and water. The successive stages of thermal decomposition of $ZrF_4$ according to Pascal (New treatise of mineral chemistry, volume IX, Ed. Masson, 1963, p. 519) are set out below. They are accompanied by the successive release of water vapour, HF gas and finally $ZrF_4$ in gaseous form.

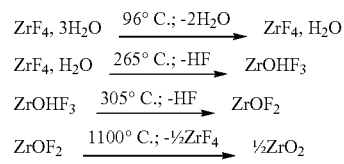

$$ZrF_4, 3H_2O \xrightarrow{96°\text{ C.}; -2H_2O} ZrF_4, H_2O$$
$$ZrF_4, H_2O \xrightarrow{265°\text{ C.}; -HF} ZrOHF_3$$
$$ZrOHF_3 \xrightarrow{305°\text{ C.}; -HF} ZrOF_2$$
$$ZrOF_2 \xrightarrow{1100°\text{ C.}; -\frac{1}{2}ZrF_4} \frac{1}{2}ZrO_2$$

There is currently no method which allows the zirconium contained in baths for pickling zirconium alloys to be effectively recycled on an industrial scale, in particular under temperature conditions which are acceptable in industrial terms. The highly corrosive nature of the compounds present is a difficulty whose effect increases with the temperature.

SUMMARY

An objective of the invention is therefore to provide a method which allows zirconium to be recovered from a source of $ZrF_4$, in a form which can be reused.

Another objective is to provide a method of this type that is suitable for reprocessing baths for pickling zirconium alloys.

Another objective of the invention is to provide a method of this type which can be used at reasonable temperatures which are compatible with economic criteria (energy cost) and which limit corrosion-related phenomena for the corresponding industrial installation.

These objectives are achieved according to the invention with a method for thermal conversion of a tetrafluoride of Zr ($ZrF_4$) into a dioxide of Zr (zirconia, or $ZrO_2$) wherein a thermal conversion operation is carried out using solid $ZrF_4$ and water which are heated in a reactor until converted into $ZrO_2$.

Unexpectedly, it has been found that, in the presence of water, the calcination reaction takes place at a relatively low temperature and leads, in a relatively short space of time, to zirconia. This new method therefore leads to zirconia being produced which can then be used in its existing state in various applications in accordance with the purity and the specific surface-area thereof or as a source of zirconium in the production of zirconium alloys, particularly in the nuclear field.

The method according to the invention can be carried out until a reaction product is obtained in which all, or almost all, of the zirconium is in the form of zirconia $ZrO_2$.

DETAILED DESCRIPTION

Figure 1:
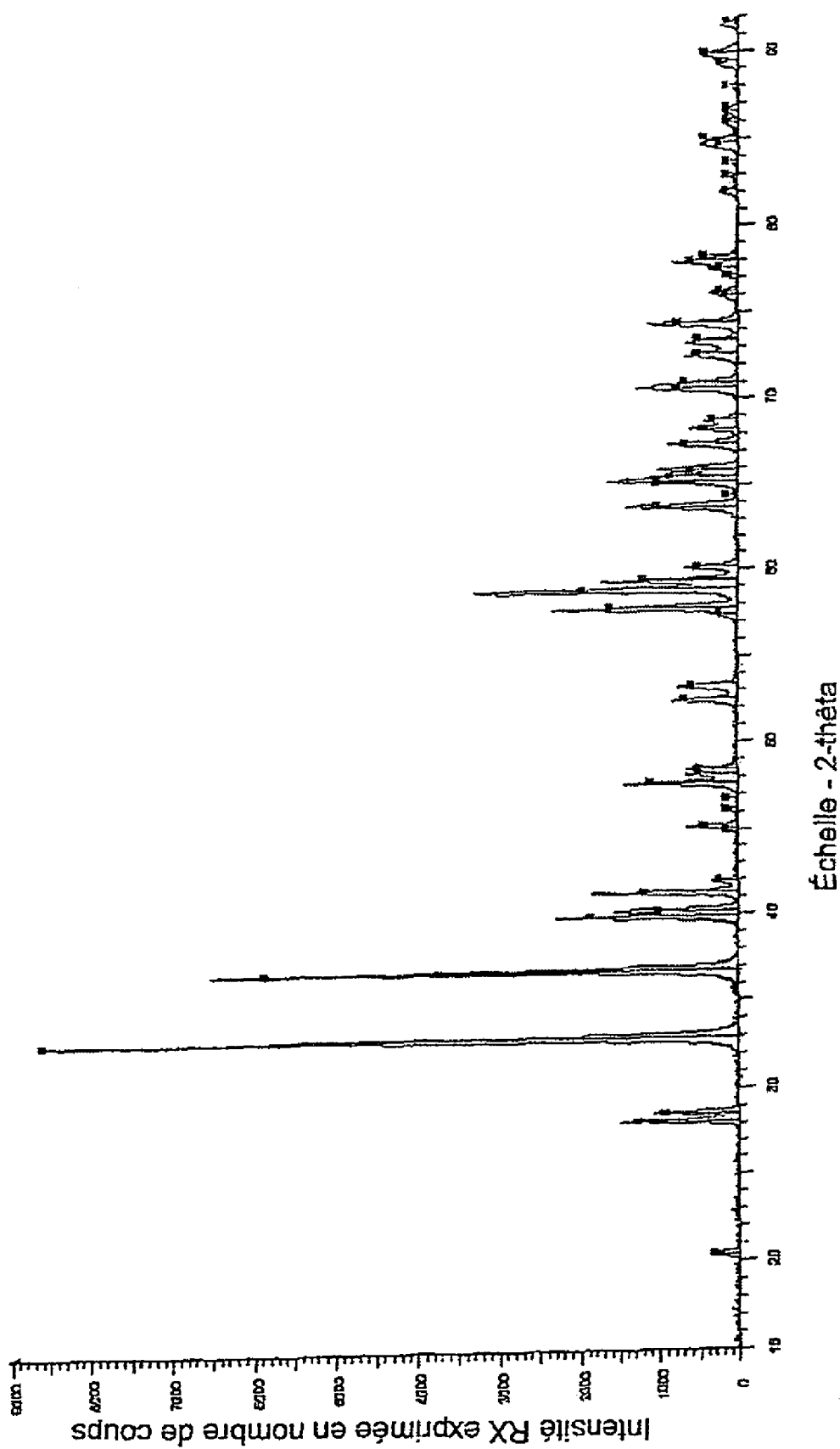
FIG. 1 is the X-ray diffraction chart for the product obtained in the reactor at the end of the method.

Typically, the initial ratio, that is to say, the ratio of the weight of $ZrF_4$ to the weight of water at the beginning of the calcination reaction may be between 1/5 and 1/500, such as between 1/10 and 1/200, or between 1/15 and 1/100. The beginning of the calcination reaction corresponds to the time at which the initial reaction admixture of water and zirconium tetrafluoride is at the calcination temperature (see below).

A ratio of this type is maintained substantially for the entire duration of the reaction, by controlled addition of water in accordance with the method used (injection, bubbling, etc. in liquid or vapour form), as explained above. Due to the consumption of zirconium tetrafluoride, the quantity of water to be added can be reduced over time.

It has been found that the temperature required for thermal conversion is lower than it would be in order to obtain the same conversion in terms of dioxide without water. It has also been found that the duration of the reaction is shortened, or that it is possible to shorten this duration by adjusting the parameters such as the temperature, a moderate increase in this temperature nonetheless being a factor which has a positive influence on the kinetics of the reaction.

The thermal conversion can thus be carried out at a temperature greater than or equal to 300° C., in particular between 300 and 800° C., or for example between 300 and 600° C., or between 350 and 450° C.

The thermal conversion is carried out in an atmosphere of neutral gas, such as argon, or in air. The neutral gas or air is circulated for example inside the reactor in order to displace the hydrofluoric gas HF which forms in the course of the reaction. This HF can be recovered any conventional technique, for example, dissolving in water.

According to a first embodiment, the zirconium tetrafluoride is introduced into the reactor in solid, such as in pulverulent form.

According to a second embodiment, the zirconium tetrafluoride is introduced into the reactor in an aqueous suspension or brine.

The water can be added to the reactor during the reaction, in liquid form or vapour form. It can be injected in one or more locations in the reactor, or be introduced via the reaction mass, for example, by bubbling or pressure-injection.

The initial $ZrF_4$ or an aqueous suspension which contains it may be from a used pickling solution for a zirconium alloy, as described in EP-A-0 723 038 which generally contains nitric acid, hydrofluoric acid, water and $ZrF_4$. This solution can be processed before conversion in order to eliminate part of the water therefrom. It is thus possible to carry out the evaporation of at least part of the water in the used solution and the crystallisation of $ZrF_4$, then the recovery of a brine or aqueous suspension of crystallized $ZrF_4$, which is used in the operation of thermal conversion.

Advantageously, it is at the same time possible to reprocess the pickling solution and recover the zirconium by combining the reprocessing technique according to EP-A-0 723 038, to which the person skilled in the art can refer for further details, and the thermal conversion according to the invention.

The method for recycling $ZrF_4$ and reprocessing the used solution for pickling zirconium alloy may thus comprise the following steps:
  part of the water contained in the used solution is evaporated under vacuum then condensed in order to obtain slightly acidic water and a concentrated acidic solution contaminated with $ZrF_4$, representing, for example, almost 30% by volume of the used solution,
  the contaminated concentrated acidic solution is processed by vacuum evaporation in a crystalliser in order to obtain crystals of $ZrF_4$ and a purified concentrated acidic solution,
  the brine or aqueous suspension of crystallised $ZrF_4$ is recovered from the bottom of the crystalliser and is used in the thermal conversion operation, and
  the slightly acidic water and the purified concentrated acidic solution are mixed in the desired proportions in order to obtain a reprocessed pickling solution.

As described in EP-A-0 723 038, the brine containing $ZrF_4$ can be further concentrated, for example, by filtration, e.g. on a filter press, resulting in a cake which is hydrated to a greater or lesser extent.

The initial $ZrF_4$ may comprise impurities which do not impair the implementation of the calcination method.

It should be noted that, in the present application, water can be added by an appropriate aqueous solution, so that the use of the term "water" also includes the use of an aqueous solution of this type.

During the thermal conversion, the reaction admixture is for example agitated. In order to ensure optimum contact, for the entire duration of the reaction, between the water and the products based on zirconium and fluorine, the person skilled in the art has at his disposal a whole range of reactors and/or other devices which provide this contact. It is thus possible to use a rotating oven and/or an oven provided with one or more appropriate agitation devices. The agitation can also be brought about by injecting water, for example, in the form of bubbling water vapour, in order to form a fluid-like bed.

The invention will now be described in greater detail using embodiments taken by way of non-limiting examples.

FIG. 1 is the X-ray diffraction chart for the product obtained in the reactor at the end of the method.

A horizontal tubular oven is used which is caused to rotate in order to bring about the agitation of the reaction admixture. Inside this oven is the reactor itself, this reactor being shaped so as to allow a flow of neutral gas to be produced, in this instance argon, in order to displace and discharge the acidic gases which will be formed (HF). The oven is provided with a temperature setting and a control system.

The parameters for the tests which were carried out are set out in Table 1 below, taking into account that zirconium tetrafluoride was introduced in solid anhydrous form.

| Test | Pressure Ar (bar) | Output Ar (l·h⁻¹) | Volume of water injected in ml | Duration in minutes | Temperature in °C | Mass of ZrF$_4$ in g |
|---|---|---|---|---|---|---|
| 1 | 0.4 | 250 | 500 | 200 | 685 | 9.187 |
| 2 | 0.4 | 250 | 500 | 200 | 500 | 8.050 |
| 3 | 0.4 | 250 | 500 | 200 | 600 | 8.040 |
| 4 | 0.4 | 250 | 500 | 200 | 550 | 8.000 |
| 5 | 0.4 | 250 | 250 | 200 | 550 | 8.050 |

Following the reaction time indicated in table 1, there was carried out an analysis of the composition in the reactor by means of X-ray diffraction using radiation of monochromatic cobalt (wavelength=0.179 nm; evaluation time=1 hour).

The X-ray diffraction chart for the product obtained following each of the tests 1 to 5 is that of monoclinical zirconia of the Baddeleyite type. This chart is illustrated in FIG. 1, with the 2-theta scale on the X-axis and the X-ray intensity expressed as a number of pulses on the Y-axis.

The method of the invention thus allows pure zirconia to be obtained rapidly from zirconium tetrafluoride under favourable economic conditions.

It must be clearly understood that the invention defined by the appended claims is not limited to the embodiments which depart neither from the scope nor from the spirit of the invention.

What is claimed is:

1. A method for converting $ZrF_4$ into $ZrO_2$, comprising: performing a thermal conversion based on solid $ZrF_4$ and water that are heated in a reactor until converted into $ZrO_2$, at a temperature greater than or equal to 300° C. and up to 450° C., wherein the initial ratio by weight of the $ZrF_4$ to the water is between 1/10 and 1/500.

2. The method according to claim 1, wherein an initial portion of the $ZrF_4$ is in a suspension in water.

3. The method according to claim 1, wherein the ratio is maintained substantially for an entire duration of the conversion.

4. The method according to claim 1, wherein the thermal conversion is performed at a temperature between 350° C. and 450° C.

5. The method according to claim 1, wherein the thermal conversion is carried out in an atmosphere of one of a neutral gas and air.

6. The method according to claim 1, wherein the $ZrF_4$ is from a used solution for pickling a zirconium alloy.

7. The method according to claim 6, wherein the used solution for pickling includes water and the $ZrF_4$ and at least part of the water present in the used solution for pickling is evaporated and the $ZrF_4$ is crystallized.

8. The method according to claim 7 wherein the step of evaporating at least part of the water in the used solution for pickling includes evaporating the at least part of the water under vacuum, then condensing in order to obtain slightly acidic water and a remaining concentrated acidic solution contaminated with $ZrF_4$ and then processing the concentrated acidic solution contaminated with $ZrF_4$ by vacuum evaporation in a crystallizer in order to obtain the crystallized $ZrF_4$ and a purified concentrated acidic solution.

9. The method according to claim 7, wherein after evaporation and crystallization of $ZrF_4$, a brine of crystallized $ZrF_4$ or an aqueous suspension of crystallized $ZrF_4$ is obtained, the brine or aqueous suspension containing $ZrF_4$ is further concentrated before being used in the thermal conversion operation.

10. The method according to claim 8 further comprising a step of mixing the slightly acidic water and the purified concentrated acidic solution in desired proportions in order to obtain a reprocessed pickling solution.

11. The method according to claim 8 further comprising recovering the crystallized $ZrF_4$ from a bottom of the crystallizer by forming a brine or aqueous suspension.

12. The method according to claim 1, wherein the thermal conversion is performed at 350° C.

13. The method according to claim 1 wherein the initial ratio by weight of the $ZrF_4$ to the water is between 1/10 and 1/200.

14. The method according to claim 1 wherein the initial ratio by weight of the $ZrF_4$ to the water is between 1/15 and 1/100.

15. The method according to claim 1 wherein the water is added in liquid form.

16. The method according to claim 1 wherein the water is injected in the reactor by bubbling.

17. The method according to claim 1 wherein during the thermal conversion the $ZrF_4$ and the water are agitated.

18. The method according to claim 1 wherein a rotating oven is used during the thermal conversion.

19. A method for converting $ZrF_4$ into $ZrO_2$, comprising: performing a thermal conversion based on solid $ZrF_4$ and water that are heated in a reactor until converted into $ZrO_2$, at a temperature greater than or equal to 350° C. and up to 450° C., wherein the initial ratio by weight of the $ZrF_4$ to the water is between 1/5 and 1/500.

20. The method according to claim 19, wherein the ratio is maintained substantially for an entire duration of the conversion.

21. The method according to claim 19, wherein the $ZrF_4$ is from a used solution for pickling a zirconium alloy.

22. The method according to claim 21, wherein the used solution for pickling includes water and the $ZrF_4$ and at least part of the water present in the used solution for pickling is evaporated and the $ZrF_4$ is crystallized.

23. The method according to claim 22 wherein the step of evaporating at least part of the water in the used solution for pickling includes evaporating the at least part of the water under vacuum, then condensing in order to obtain slightly acidic water and a remaining concentrated acidic solution contaminated with $ZrF_4$ and then processing the concentrated acidic solution contaminated with $ZrF_4$ by vacuum evaporation in a crystallizer in order to obtain the crystallized $ZrF_4$ and a purified concentrated acidic solution.

24. The method according to claim 22, wherein after evaporation and crystallization of $ZrF_4$, a brine of crystallized $ZrF_4$ or an aqueous suspension of crystallized $ZrF_4$ is obtained, the brine or aqueous suspension containing $ZrF_4$ is further concentrated before being used in the thermal conversion operation.

25. The method according to claim 23 further comprising a step of mixing the slightly acidic water and the purified concentrated acidic solution in desired proportions in order to obtain a reprocessed pickling solution.

26. The method according to claim 23 further comprising recovering the crystallized $ZrF_4$ from a bottom of the crystallizer by forming a brine or aqueous suspension.

* * * * *